(12) United States Patent
Hu et al.

(10) Patent No.: US 8,749,332 B1
(45) Date of Patent: Jun. 10, 2014

(54) MULTI-PHASE RESONANT CONVERTER WITH TRIMMABLE INDUCTOR AND PHASE CURRENT BALANCING METHOD

(75) Inventors: Gordon Zongbo Hu, Guangdong (CN); Andrew Guoqun Li, Guangdong (CN); Rolf Baldauf, Moenchaltorf (CH)

(73) Assignee: Power-One, Inc., Camarillo, CA (US)

( * ) Notice: Subject to any disclaimer, the term of this patent is extended or adjusted under 35 U.S.C. 154(b) by 264 days.

(21) Appl. No.: 13/227,302

(22) Filed: Sep. 7, 2011

Related U.S. Application Data

(60) Provisional application No. 61/448,856, filed on Mar. 3, 2011.

(51) Int. Cl.
*H01F 30/14* (2006.01)
*H01F 21/02* (2006.01)
*H01F 21/10* (2006.01)

(52) U.S. Cl.
USPC .................................. 336/10; 336/30; 336/87

(58) Field of Classification Search
CPC ..... H01F 3/14; H01F 2003/103; H01F 29/14; H01F 27/346; H01F 29/146; H02M 1/4208; G01R 21/08
USPC ......... 336/10, 20, 40, 65, 67, 84 R, 84 M, 87, 336/133, 134; 335/211, 212, 213
See application file for complete search history.

(56) References Cited

U.S. PATENT DOCUMENTS

| | | | | |
|---|---|---|---|---|
| 2,322,498 | A | | 6/1943 | Zeitlin |
| 2,562,640 | A | | 7/1951 | Reason |
| 3,197,721 | A | * | 7/1965 | Bogotch et al. ............... 333/171 |
| 3,894,279 | A | * | 7/1975 | Priebe ............................. 363/48 |
| 3,968,465 | A | * | 7/1976 | Fukui et al. .................... 336/110 |
| 4,008,450 | A | * | 2/1977 | Argoudelis ..................... 336/132 |
| 5,373,144 | A | * | 12/1994 | Thelander ...................... 219/659 |
| 5,373,432 | A | | 12/1994 | Vollin et al. |
| 5,596,469 | A | * | 1/1997 | Kuznetsov ....................... 361/58 |
| 6,188,209 | B1 | | 2/2001 | Poon et al. |
| 6,674,320 | B2 | | 1/2004 | Duffy et al. |
| 7,295,092 | B2 | * | 11/2007 | Elliott et al. ................... 336/178 |
| 7,501,925 | B2 | * | 3/2009 | Naito et al. .................... 336/233 |
| 7,889,040 | B2 | * | 2/2011 | Viitanen et al. ................ 336/110 |
| 2004/0239463 | A1 | | 12/2004 | Poniatowski et al. |

\* cited by examiner

*Primary Examiner* — Alexander Talpalatski
*Assistant Examiner* — Joselito Baisa
(74) *Attorney, Agent, or Firm* — Waddey Patterson; Mark J. Patterson (57) ABSTRACT

A trimmable inductor assembly is provided for optimal balancing of phase currents in a multi-phase resonant converter. A magnetic device includes first and second core portions defining an outer edge of the device having a first axis, and further defining a first air gap. A bracket is positioned proximate the outer edge of the device and a magnetic plate is coupled to the bracket, with the magnetic plate and the second core portion defining a second air gap. A positioning device is coupled to the bracket and is responsive to control signals based on a detected phase current imbalance to drive the bracket and the magnetic plate between a first position defining a minimum air gap for the assembly and a second position defining a maximum air gap for the assembly.

14 Claims, 8 Drawing Sheets

MULTI-PHASE RESONANT CONVERTER WITH TRIMMABLE INDUCTOR AND PHASE CURRENT BALANCING METHOD

CROSS-REFERENCES TO RELATED APPLICATIONS

This application claims benefit of the following patent application(s) which is/are hereby incorporated by reference: U.S. Provisional Patent Application No. 61/448,856, filed on Mar. 3, 2011.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to multi-phase resonant power converters. More particularly, the present invention relates to a multi-phase resonant power converter having circuitry and associated control methods to continuously adjust a resonant inductance and effectively balance the various phase currents.

Resonant converters have recently become progressively popular in power conversion, as zero volt switching and/or zero current switching can be achieved at the primary and/or secondary sides of the converter. Accordingly, high efficiency can be obtained due to lower switching power consumption.

To deliver more power, multi-phase resonant converters have been developed. Besides higher efficiency with phase management during light load conditions, another key benefit with multi-phase topologies is output ripple cancellation. Using the example of a single phase LLC converter, the ripple current may be up to 48.3% of the output current. However, the ripple current is reduced to 9.8% when two-phase interleaved LLC converters are utilized. Furthermore, three-phase interleaved LLC converters can achieve 4.2% ripple current. By calculation, the ripple current may be as low as 1% when six-phase interleaved LLC converters are adopted, meaning that no output capacitive filter would theoretically be required.

Unfortunately, the phase current may not be perfectly balanced because of resonant parameter sensitivity. Component tolerances, parameter variations with temperature, and loading and circuit parasitics all contribute to current imbalances among the various phases. In the worst case, the unit may fail due to overheating of the most heavily loaded phase. Phase current imbalance is therefore a very common issue in multi-phase resonant converters.

Figure 7:
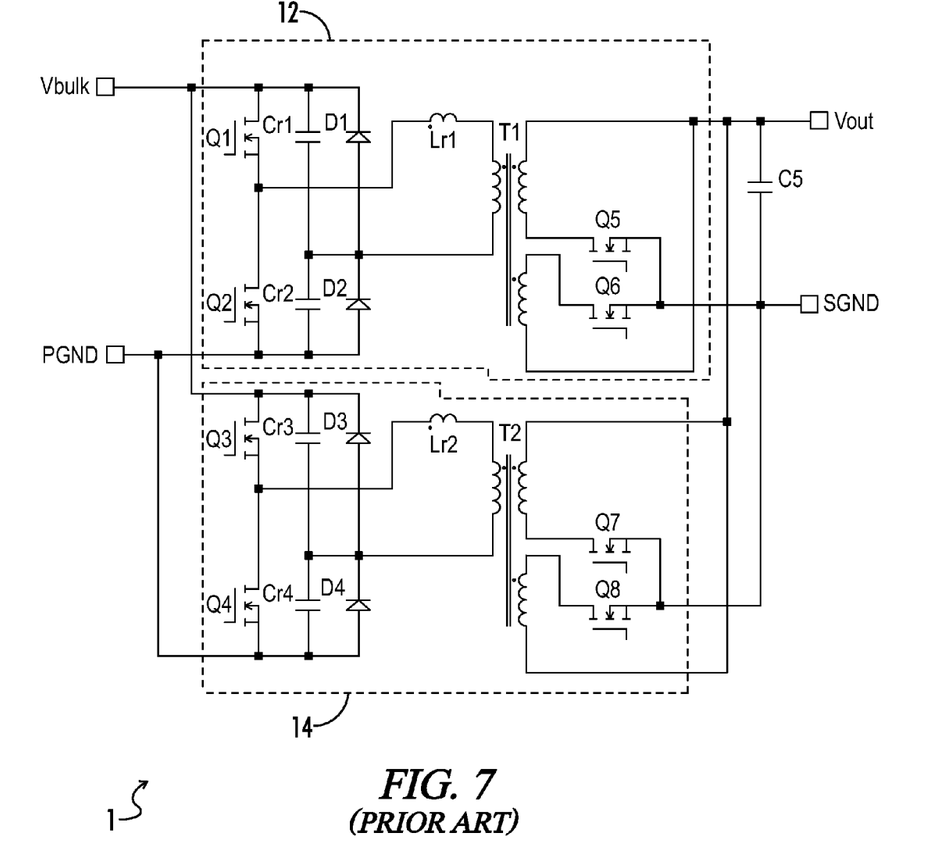
FIG. 7 is a circuit block diagram representing a multi-phase converter as is conventionally known in the art.

Referring to FIG. 7, an exemplary interleaved LLC converter 1 is represented as is known in the art. As is known in the art, the resonant frequency is given in accordance with the below Formula 1, where Lr stands for the inductance of the resonant inductor and Cr is the capacitance of the resonant capacitor (Cr is the parallel connection of Cr1 and Cr2, Cr3 and Cr4):

$$Fr = \frac{1}{2\pi\sqrt{LrCr}};$$

$$Lr = Lr1 = Lr2;$$

$$Cr = Cr1 + Cr2;$$

$$Cr1 = Cr2 = Cr3 = Cr4$$

To achieve higher efficiency, the switching frequency should be set as close as possible to the resonant frequency.

The resonant inductor is the decisive component in an efficiency-optimized LLC circuit, which is reflected in that accurate capacitors (for example +/−5%) are readily available, but it is far more difficult to build accurate inductors without any trimming of the inductor (for example <+/−10%). Because not only the resonance frequency needs to be precise, but also the characteristic impedance of the resonance network (sqrt(Lr/Cr)), both components should be available with a low tolerance to assure a well balanced current in both phases. Therefore there is a need to have an adjustable resonance inductor.

It would therefore be desirable to provide a system and method which focuses on effectively reducing component sensitivity in the resonant inductance to achieve an optimal current balance in the multi-phase LLC converter.

BRIEF SUMMARY OF THE INVENTION

A multi-phase resonant converter in accordance with the present invention is provided with a trimmable inductor which allows the resonant inductance associated with one or more phases to be adjusted continuously. In this manner the resonant parameters may be adjusted so as to effectively balance the various phase currents.

In an embodiment, a trimmable inductor assembly includes a magnetic device with a first core portion having an end with first and second faces and a second core portion also having an end with first and second faces. The first faces of the first and second core portions define a substantially planar outer end of the device having a first axis, and the second faces of the first and second core portions further define a first air gap therebetween. A bracket is positioned proximate the first face of the first core portion, and a magnetic plate is coupled to the bracket with the magnetic plate and the second face of the second core portion defining a second air gap therebetween. A positioning device is coupled to the bracket and is effective to drive the bracket and the magnetic plate along a second axis parallel to the first axis between a first position defining a minimum air gap for the assembly and a second position defining a maximum air gap for the assembly.

In another embodiment, a multi-phase converter in accordance with the present invention includes a first converter circuit having a resonant inductor and is effective to generate a first phase current based on an inductance associated with the resonant inductor, and a second converter circuit having a trimmable inductor and effective to generate a second phase current based on an inductance associated with the trimmable inductor. The trimmable inductor includes a first core portion having an end with first and second faces, and a second core portion also having an end with first and second faces. The first faces of the first and second core portions define a substantially planar outer end of the inductor having a first axis, and the second faces of the first and second core portions further define a first air gap therebetween. A bracket is positioned proximate the first face of the first core portion, with a magnetic plate coupled to the bracket such that the magnetic plate and the second face of the second core portion define a second air gap therebetween. A positioning device is coupled to the bracket and drives the bracket and the magnetic plate along a second axis parallel to the first axis between a first position defining a minimum air gap for the trimmable inductor and a second position defining a maximum air gap for the trimmable inductor. The first and second phase currents from the converters are detected by current sensing circuitry wherein the positioning device can be tuned based on a comparison of the first and second phase currents such that phase currents among multi phases are balanced well.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical or mechanical connection between recited items or an indirect connection through one or more passive or active intermediary devices. The term "circuit" means at least either a single component or a multiplicity of components, either active and/or passive, that are coupled together to provide a desired function. The term "signal" as used herein may include any meanings as may be understood by those of ordinary skill in the art, including at least one current, voltage, charge, temperature, data or a state of one or more memory locations as expressed on one or more transmission mediums.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Referring generally to FIGS. 1-6b, various embodiments are described herein for a trimmable inductor in accordance with the present invention. Where the various figures may describe embodiments sharing various common elements and features with other embodiments, similar elements and features are given the same reference numerals and redundant description thereof may be omitted below.

Figure 1:
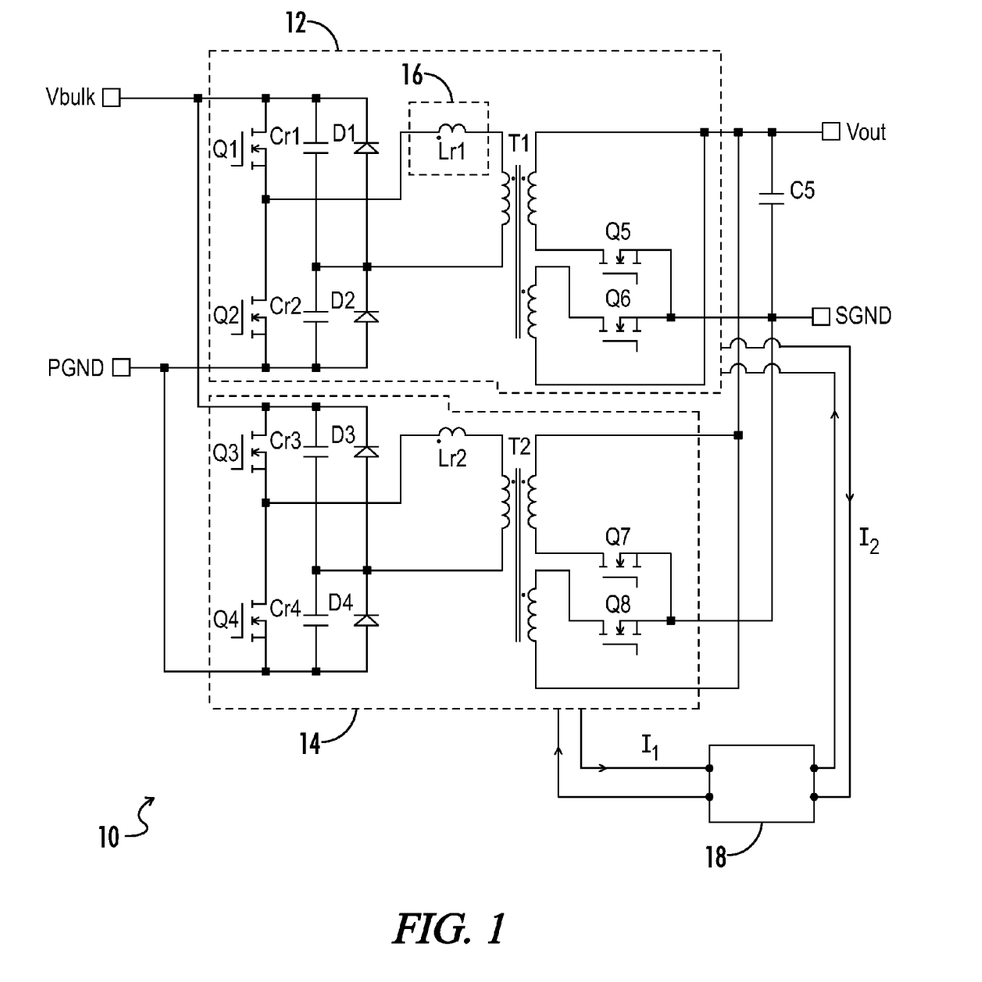
FIG. 1 is a circuit block diagram representing an embodiment of a multi-phase converter in accordance with the present invention.

Referring first to FIG. 1, a multi-phase resonant converter 10 in accordance with the present invention is distinguished from the prior art converter as represented in FIG. 7 in that at least one of a first converter circuit 12 and second converter circuit 14 includes a trimmable inductor 16 in place of the conventional resonant inductor Lr. A current sensing circuit 18 is further provided which is effective to detect phase currents I1, I2 from the first and second converter circuits 12, 14, respectively, wherein the trimmable inductor may be adjusted accordingly based on a determination that the phase currents are not properly balanced. An exemplary embodiment of the current sensing circuit may include a measurement device such as an oscilloscope and associated leads arranged to measure for example the amplitude of the AC voltage across the resonant capacitor(s) Cr1/Cr2. The voltage difference between the two phases across these capacitors (assuming equal capacitance values) is an indication of the imbalance between the phases.

In various embodiments the current sensing circuit 18 may be coupled to a digital display device or the like, by which an operator of the trimmable inductor may determine a phase current balancing status and adjust the trimmable inductor manually to obtain a proper balance. In other embodiments the current sensing circuit 18 may be coupled to a controller (not shown) which performs a determination process with regards to the phase current balancing status and provides an associated indication to an operator. Alternatively, a controller within the scope of the present invention may be configured to determine the phase current balancing status based on signals received from the current sensing circuit, and to automatically and continuously adjust the trimmable inductor based on the determination. The terms "controller" and "control circuit" as may be used interchangeably herein refer to at least a general microprocessor, an application specific integrated circuit (ASIC), a digital signal processor (DSP), a microcontroller, a field programmable gate array, various alternative blocks of discrete circuitry as known in the art, or a combination of any of the above designed to perform functions as further defined herein.

Figure 2A:
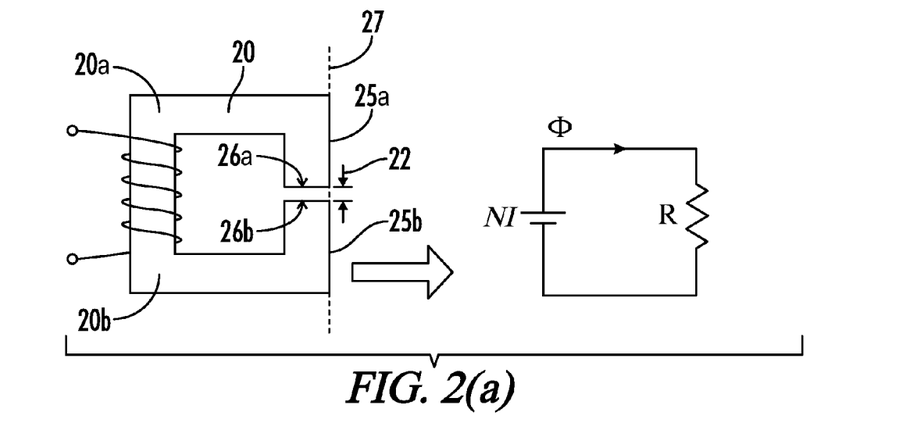
FIG. 2(a) is a schematic/graphical representation of a conventional magnetic circuit operation.
Figure 2B:
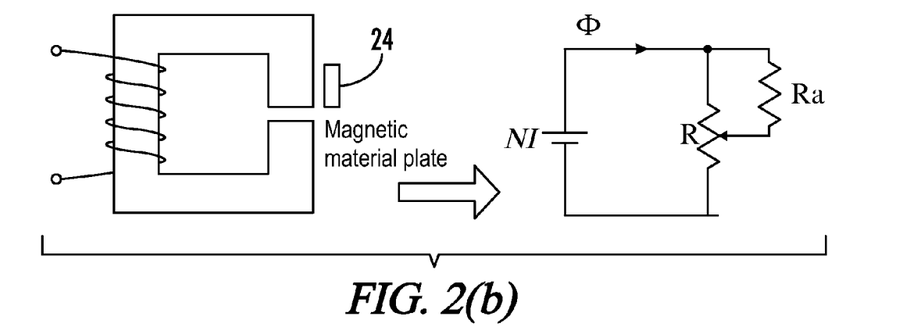
FIG. 2(b) is a schematic/graphical representation of a magnetic circuit operation using a trimmable inductor of the present invention.

The operating principle behind various embodiments of the trimmable inductor 16 may be described with reference to FIGS. 2(a) and 2(b). An exemplary magnetic core 20 is shown having a first core portion 20a and a second core portion 20b each having first faces 26a, 26b, respectively, which collectively define an air gap 22. As represented in the simplified equivalent circuit of FIG. 2(a), the magnetic impedance and accordingly the inductance of the inductor are functions of the magnetic resistance R of the air gap 22. As represented in FIG. 2(b), an external magnetic material plate 24 may be introduced proximate second faces 25a, 25b of the core portions 20a, 20b, respectively, which further define an outer edge of the inductor. As the plate 24 moves up and down or otherwise along an axis 27 defined by the second faces 25a, 25b and across the air gap 22 in the outer edge of the inductor, the resistance of the air gap 22 is modulated in association with the position of the plate 24 relative to the air gap 22 and as further represented in the simplified equivalent circuit of FIG. 2(b).

The magnetic impedance of the trimmable inductor 16 therefore varies by driving the magnetic material plate 24 across the air gap 22, substantially without regards to the kind of material utilized (e.g., powder, ferrite, etc.), shape (e.g., toroid, EQ, PQ, etc.), or size of the core. As a result, the equivalent inductance is also changed accordingly.

In various embodiments, the magnetic material plate 24 may be constructed using the same kind of magnetic material as that of the main core 20, but alternative embodiments in which the materials are different are also within the scope of the present invention.

Figure 3A:
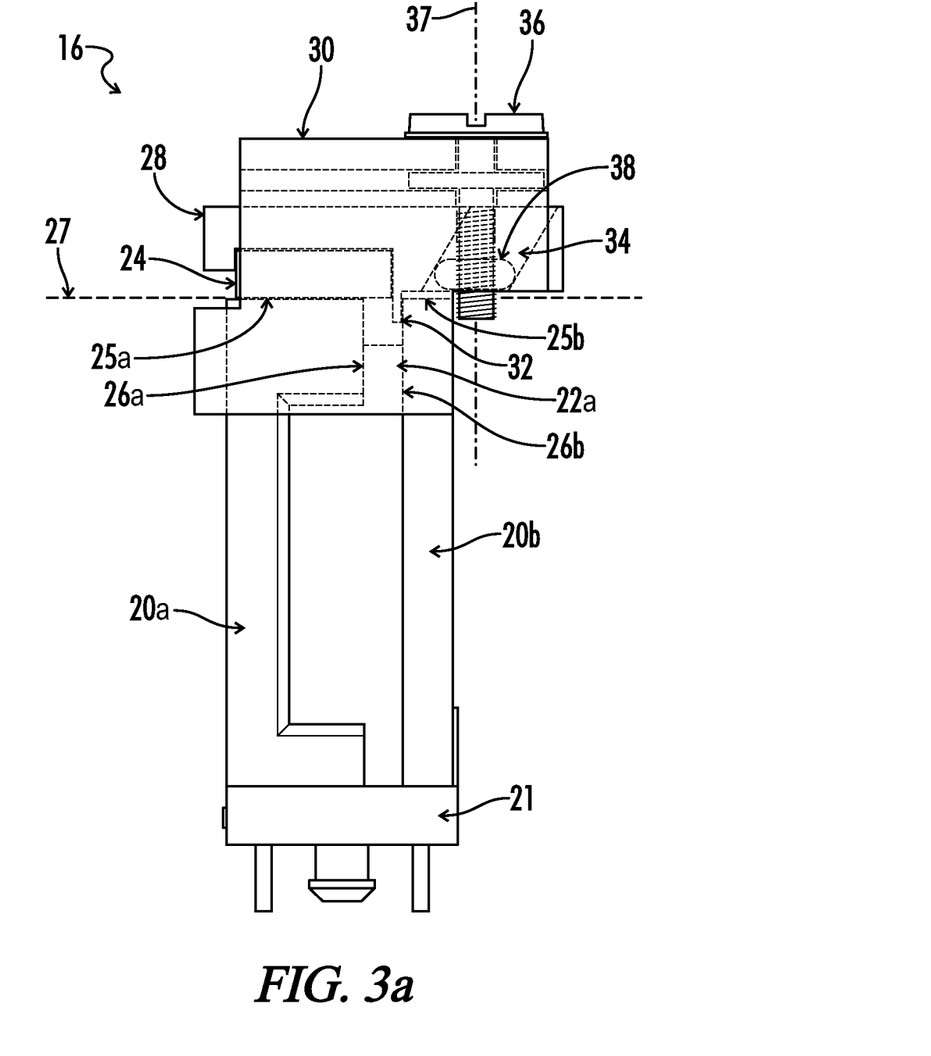
FIG. 3(a) is a front view of an embodiment of a trimmable inductor of the present invention in a first position.
Figure 3B:
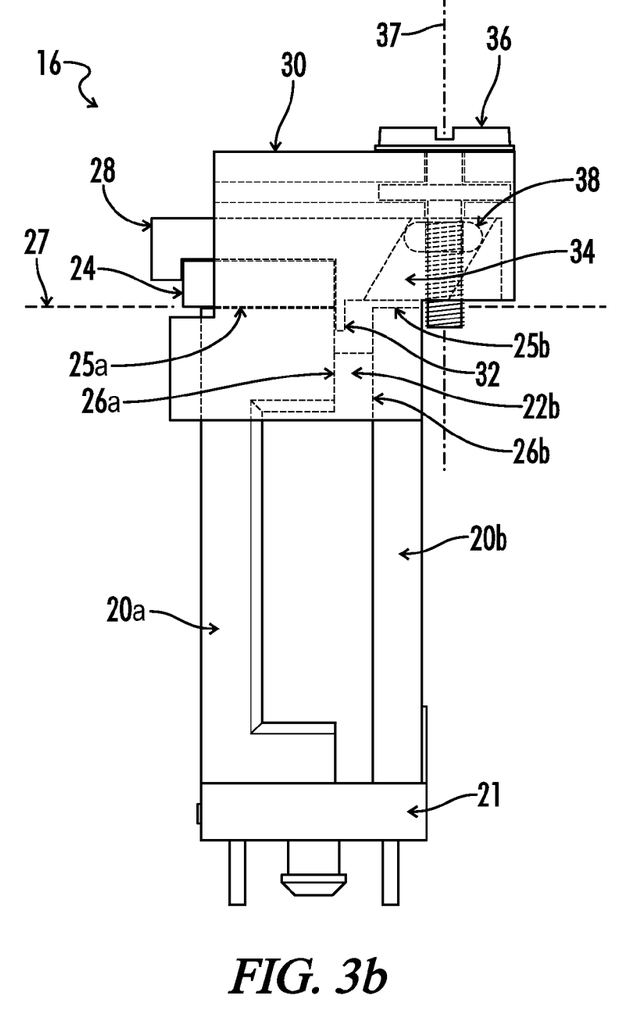
FIG. 3(b) is a front view of the trimmable inductor of FIG. 3(a) in a second position.

Referring now to FIGS. 3(a) and 3(b), in one embodiment a trimmable inductor 16 in accordance with the present invention may be formed as a compact assembly including a magnetic core 20 having a first core portion 20a and a second core portion 20b and a fixture coupled to the core for moving a flexible magnetic material plate 24 with respect to an air gap 22 between the core portions 20a, 20b. As shown in the embodiment of FIGS. 3(a) and 3(b) the core portions 20a, 20b are physically separate from each other, but a unitary core having first and second portions 20a, 20b is further anticipated within the scope of the present invention. With respect to this description, the terms "up," "down," "left" and "right" will be used for clarity only and are not intended to be limiting on the available configurations for the present invention.

A small bracket 28 is configured to hold the magnetic material plate 24 in a fixed position relative to the bracket 28. A large bracket 30 is coupled to the core 20 and is further coupled to or otherwise shaped to receive and hold in place a positioning device 36 which, in the embodiment shown, is a threaded screw 36 around which is positioned a correspondingly threaded ring member 38. The ring member 38 may take on various forms equally effective to carry out the functions recited in association with the various embodiments described herein, and is not necessarily limited to a circular shape. The small bracket 28 has a first end facing the core 20 and a second opposing end, with a sloped channel 34 extending all or part of the way between the first and second ends. The ring member 38 is positioned within the channel 34 and sized to substantially engage both sides of the channel so that as the screw 36 is turned, the screw 36 remains held in place relative to the large bracket 30 but causes the ring member 38 to move along the length of the screw 36 and accordingly engage one of the sides of channel 34.

As the ring member 38 pushes against a side of the channel 34, the small bracket 28 and thereby the magnetic material plate 24 slide along an axis parallel to that axis 27 defined by the outer faces 25a, 25b of the core portions 20a, 20b, respectively. As the ring member 38 is driven up, the applied force on the left surface of the channel 34 pushes the bracket 28 to the left. At the same time, the magnetic material plate 24 moves to the left together with the small bracket 28. As the ring member 38, is driven down, an applied force on the right surface of the channel 34 pushes the bracket 28 to the right, along with the magnetic material plate 24.

In this manner, by turning the screw 36 the movable magnetic material plate 24 may be used to adjust an air gap defined between the plate 24 and the second core portion 20b by sliding between a first position defining a minimum air gap 22a (as shown in FIG. 3(a)) and a second position defining a maximum air gap 22b (as shown in FIG. 3(b)). To avoid magnetizing saturation, the small bracket 28 in various embodiments may include a tab 32 extending between the first faces 26a, 26b of the first and second core portions 20a, 20b, respectively. The tab 32 prevents the magnetic material plate 24 from being driven all the way across the air gap 22 between the core portions by engaging the face 26b of the second core portion 20b. Therefore, the thickness of the tab 32 substantially defines the minimum air gap for the trimmable inductor 16. Likewise, where the tab 32 engages the face 26a of the first core portion 20a when it is driven far enough in the opposite direction, it serves to prevent further such movement and thereby define the maximum air gap between the magnetic material plate 24 and the second core portion 20b. It may generally be considered however in an embodiment as represented in FIGS. 3(a) and 3(b) that a maximum air gap for the inductor 16 as a whole will be equivalent to the air gap 22 between the first and second core portions 20a, 20b.

Figure 4A:
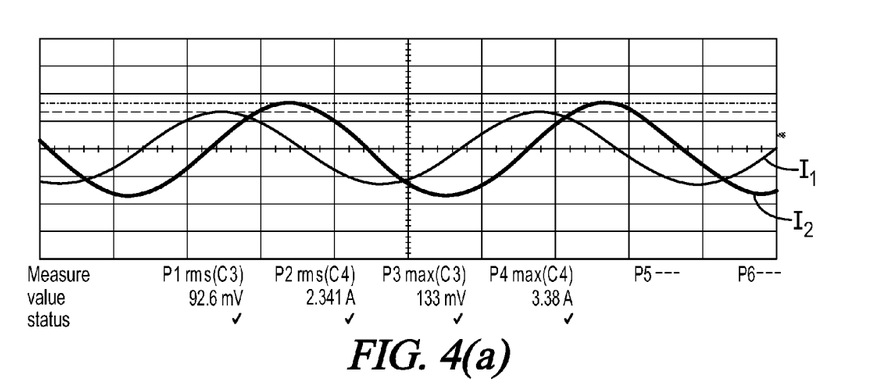
FIGS. 4(a), 4(b) and 4(c) are graphical representations of exemplary phase currents detected from first and second converter circuits in the multi-phase converter of FIG. 1.
Figure 4B:
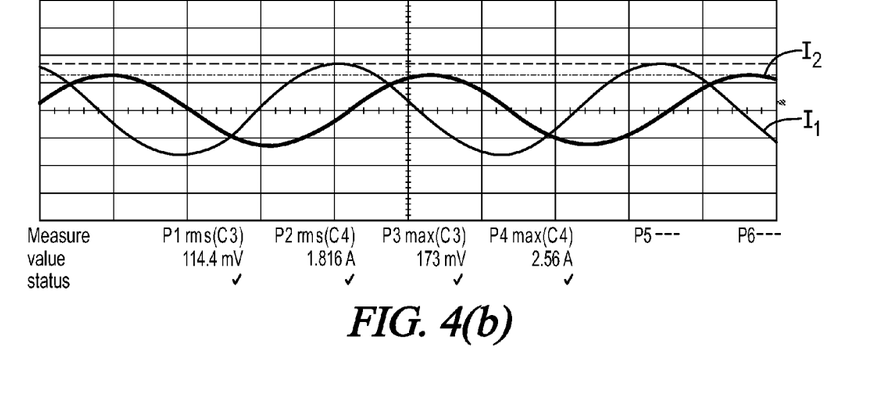
Figure 4C:
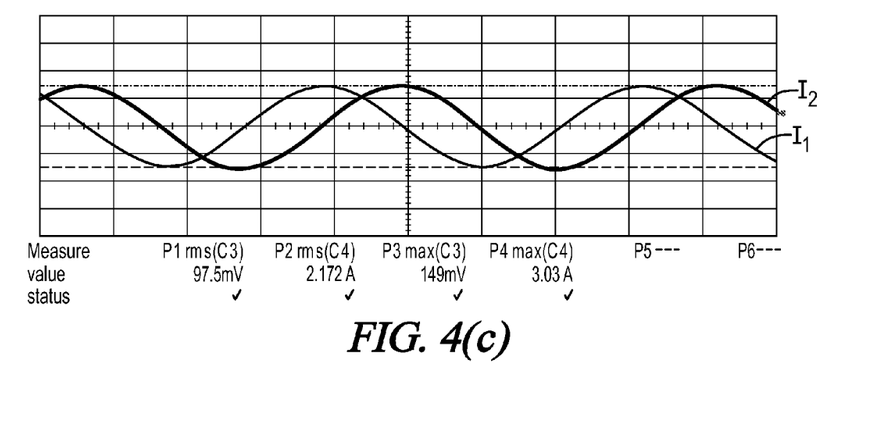

Referring to FIGS. 4(a), 4(b) and 4(c), waveforms are shown representing a case where a first phase current imbalance is detected by the control circuit (i.e., an amplitude of phase current I1 from the first converter 12 is greater than an amplitude of phase current I2 from the second converter 14) as shown in FIG. 4(b), a case where a second phase current imbalance is detected (i.e., the amplitude of I2 is greater than the amplitude of I1) as shown in FIG. 4(a), and a case where there is no phase current imbalance detected as shown in FIG. 4(c).

A control circuit (not shown) may in certain embodiments be provided to generate control signals to the first and second converter circuits 12, 14, respectively, depending on which converter is configured with the trimmable inductor 16, and cause the screw to be turned. It may be understood that intermediate devices, gears, circuitry and/or combinations thereof may be provided within the scope of the present invention between the controller 18 and the screw 36 to receive the control signals and actually effect the turning of the screw and subsequently the driving of the magnetic material plate, but these may be implemented in various fashions as may be understood by those of skill in the art and without requiring further description herein.

Figure 5:
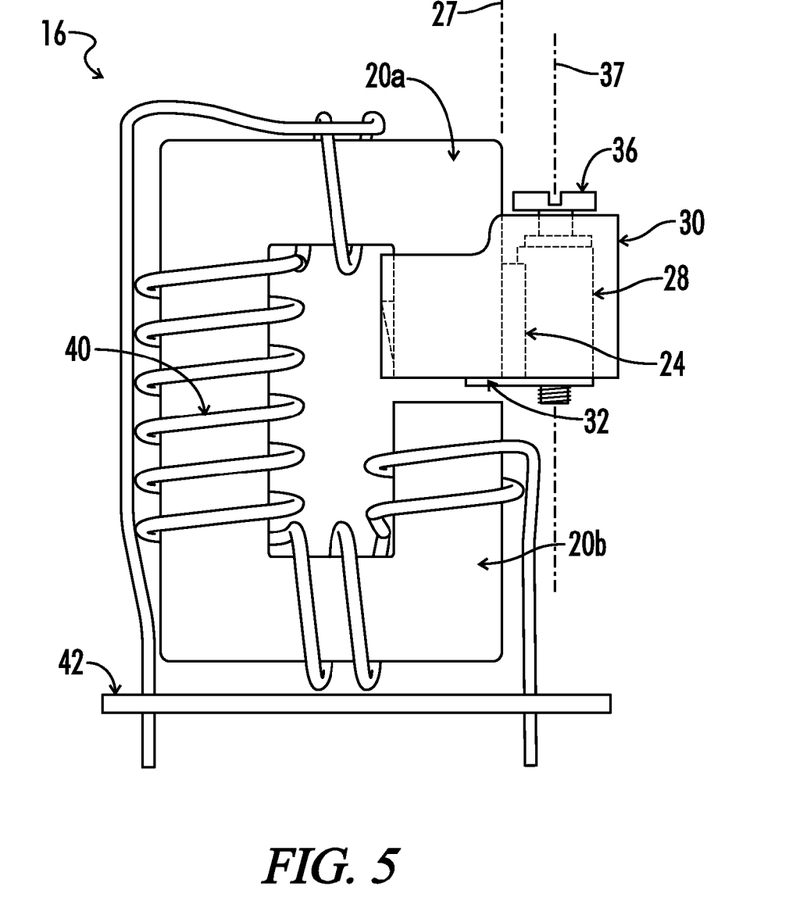
FIG. 5 is a front view of another embodiment of a trimmable inductor of the present invention.

Referring now to FIG. 5, in an alternative embodiment the large bracket 30 may be positioned to envelop a leg of the first core portion 20a and thereby occupy a portion of the core window itself. The positioning member 36 (e.g., screw) may be positioned along an axis parallel to that axis 27 defined by the outer faces of the magnetic core portions 20a, 20b. In this case the small bracket 28 rather than including a sloped channel as represented in previous embodiments may have a threaded channel shaped to receive correspondingly threaded portions of the screw 36. Turning of the screw may thus accordingly drive the small bracket 28 and the magnetic material plate 24 up and down via the channel/screw hole in the small bracket directly and without the additional features previously described, while still adjusting the air gap and thereby adhering to the trimmable inductance operating principle recited in FIG. 2(b).

Figure 6A:
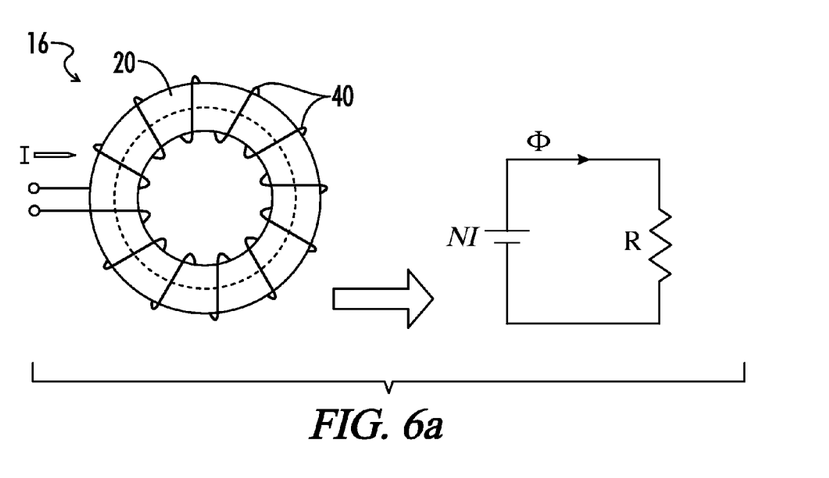
FIGS. 6(a) and 6(b) are schematic/graphical representations of an alternative embodiment of a trimmable inductor of the present invention having no air gap.
Figure 6B:
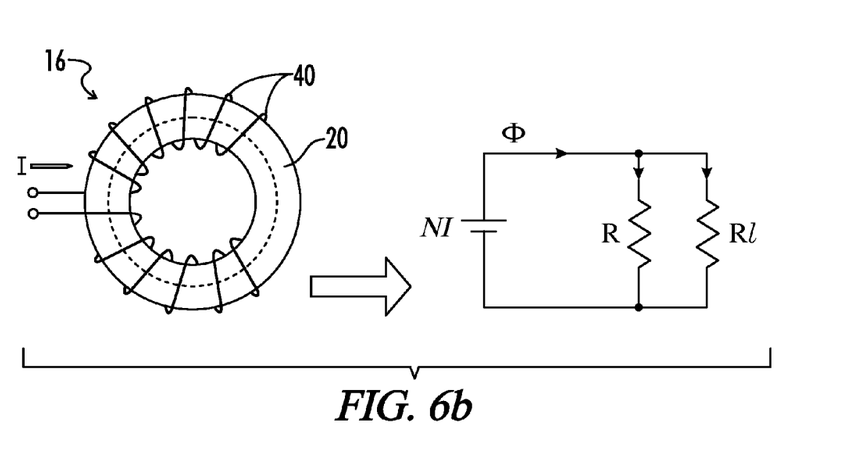

Referring now to FIGS. 6(a) and 6(b), in alternative embodiments the trimmable inductor 16 may be provided without an air gap at all. In a toroid magnetic core 20 as represented in FIG. 6(a), the windings 40 may generally be evenly distributed about the circumference of the toroid 20 so as to provide the same simplified equivalent circuit as previously represented in FIG. 2(a). In accordance with the present invention, the locations of the windings 40 may be adjusted relative to the toroid based on a detected phase current imbalance, or in other words modified to provide an unevenly distributed configuration about the toroid and provide a simplified equivalent circuit such as represented in FIG. 6(b), which accordingly adjusts the inductance.

The previous detailed description has been provided for the purposes of illustration and description. Thus, although there have been described particular embodiments of the present invention of a new and useful "Multi-Phase Resonant Converter with Trimmable Inductor and Phase Current Balancing Method," it is not intended that such references be construed as limitations upon the scope of this invention except as set forth in the following claims.

What is claimed is:

1. An assembly comprising:
    a magnetic device comprising a first core portion having an end with first and second faces and a second core portion having an end with first and second faces, the first faces of the first and second core portions defining a substantially planar outer end of the device having a first axis, the second faces of the first and second core portions defining a first air gap therebetween;
    a bracket positioned proximate the first face of the first core portion;
    a magnetic plate coupled to the bracket, the magnetic plate and the second face of the second core portion defining a second air gap therebetween;
    a positioning device coupled to the bracket and effective to drive the bracket and the magnetic plate along a second axis parallel to the first axis between a first position defining a minimum air gap for the assembly and a second position defining a maximum air gap for the assembly; and
    the bracket comprising a tab having a tab thickness and extending into the air gap defined by the second faces of the first and second core portions, the tab positioned to engage the second face of the second core portion in the first position wherein the tab thickness defines the minimum air gap for the assembly.

2. The assembly of claim 1 wherein the tab is positioned to engage the second face of the first core portion in the second position wherein the air gap between the second faces of the first and second core portions defines the maximum air gap for the assembly.

3. The assembly of claim 2, wherein the bracket further comprises a first bracket, the assembly further comprising a second bracket coupled to the first core portion and configured to receive the first bracket and the positioning device.

4. The assembly of claim 3, wherein:
    the first bracket comprises a first end proximate the outer face of the magnetic device, an opposing second end, and a sloped channel extending therebetween;
    the positioning device comprises a screw having a screw axis perpendicular to the first and second axes, and a ring member positioned about and threaded in association with the screw and further disposed within the sloped channel of the first bracket; and
    wherein rotation of the screw drives the ring member along the screw axis to engage the sloped channel and further drive the first bracket along the second axis.

5. The assembly of claim 3, wherein:
    the first bracket comprises first and second opposing ends and a threaded channel extending therebetween and along the second axis; and
    the positioning device comprises a screw received within and correspondingly threaded with the channel of the first bracket, wherein rotation of the screw drives the first bracket along the second axis.

6. A multi-phase converter comprising:
    a first converter circuit having a resonant inductor and effective to generate a first phase current based on an inductance associated with the resonant inductor;
    a second converter circuit having a trimmable inductor and effective to generate a second phase current based on an inductance associated with the trimmable inductor, the trimmable inductor comprising
        a first core portion having an end with first and second faces,
        a second core portion having an end with first and second faces, the first faces of the first and second core portions defining a substantially planar outer end of the inductor having a first axis, the second faces of the first and second core portions defining a first air gap therebetween,
        a bracket positioned proximate the first face of the first core portion,
        a magnetic plate coupled to the bracket, the magnetic plate and the second face of the second core portion defining a second air gap therebetween,
        a positioning device coupled to the bracket and effective to drive the bracket and the magnetic plate along a second axis parallel to the first axis between a first position defining a minimum air gap for the trimmable inductor and a second position defining a maximum air gap for the trimmable inductor;
    a current sensing circuit effective to detect the first and second phase currents from the converters, a comparison of the detected first and second phase currents further defining a first phase current imbalance state wherein an amplitude of the first phase current is greater than an amplitude of the second phase current and a second phase current imbalance state wherein an amplitude of the second phase current is greater than an amplitude of the first phase current; and
    wherein the bracket comprises a tab having a tab thickness and extending into the air gap defined by the second faces of the first and second core portions, the tab positioned to engage the second face of the second core portion in the first position wherein the tab thickness defines the minimum air gap for the trimmable inductor.

7. The converter of claim 6, wherein the tab is positioned to engage the second face of the first core portion in the second position wherein the air gap between the second faces of the first and second core portions defines the maximum air gap for the trimmable inductor.

8. The converter of claim 7, wherein:
    the bracket further comprises a first bracket; and
    the trimmable inductor further comprises a second bracket coupled to the first core portion that is configured to receive the first bracket and the positioning device.

9. The converter of claim 8, wherein:
    the first bracket comprises a first end proximate the outer end of the inductor, an opposing second end, and a sloped channel extending therebetween;
    the positioning device comprises a screw having an axis perpendicular to the first and second axes, and a ring member positioned about and threaded in association with the screw and further disposed within the sloped channel of the first bracket; and
    wherein rotation of the screw drives the ring member along the screw axis to engage the sloped channel and further drive the first bracket along the second axis.

10. The converter of claim 8, wherein:
    the first bracket comprises first and second opposing ends and a threaded channel extending therebetween and along the second axis;

the positioning device comprises a screw received within and correspondingly threaded with the channel of the first bracket; and wherein rotation of the screw drives the first bracket along the second axis.

11. A method of balancing phase currents in a multi-phase resonant converter having first and second converter circuits, at least one of said converter circuits having a resonant inductor with first and second magnetic core portions having first faces collectively defining an outer edge of the inductor and further having second faces defining a first air gap therebetween, the method comprising:

positioning a magnetic plate proximate the first face of the first core portion and define a second air gap with respect to the second core portion;

detecting a first phase current generated by the first converter circuit;

detecting a second phase current generated by the second converter circuit;

comparing the first and second phase currents to determine a phase current imbalance state; and driving the magnetic plate based on the determined phase current imbalance state between a first position defining a minimum air gap for the resonant inductor and a second position defining a maximum air gap for the resonant inductor;

wherein the step of positioning a magnetic plate proximate the first face of the first core portion and define a second air gap with respect to the second core portion comprises positioning a bracket proximate the first face of the first core portion, and coupling the magnetic plate to the bracket so as to define the second air gap; and controlling a positioning device coupled to the bracket to drive the bracket and the magnetic plate based on a first determined state wherein an amplitude of the first phase current is greater than the second phase current, and a second determined state wherein an amplitude of the second phase current is greater than the first phase current, wherein the bracket comprises a tab having a tab thickness and extending into the air gap defined by the second faces of the first and second core portions and the tab is positioned to engage the second face of the second core portion in the first position such that the tab thickness defines the minimum air gap for the inductor.

12. The method of claim 11, wherein the tab is positioned to engage the second face of the first core portion in the second position such that the air gap between the second faces of the first and second core portions defines the maximum inductor air gap.

13. The method of claim 11, wherein:

the bracket comprises a first end proximate the outer edge of the inductor, an opposing second end, and a sloped channel extending therebetween;

the positioning device comprises a screw having an axis perpendicular to the first and second axes, and a ring member positioned about and threaded in association with the screw and further disposed within the sloped channel of the first bracket; and wherein the step of controlling the positioning device comprises rotating the screw and correspondingly driving the ring member along the screw axis to engage the sloped channel and to further drive the first bracket between the first and second positions based on a first determined state wherein an amplitude of the first phase current is greater than the second phase current, and a second determined state wherein an amplitude of the second phase current is greater than the first phase current.

14. The method of claim 11, wherein:

the first bracket comprises first and second opposing ends and a threaded channel extending therebetween;

the positioning device comprises a screw received within and correspondingly threaded with the channel of the first bracket; and wherein the step of controlling the positioning device comprises rotating the screw and correspondingly driving the first bracket between the first and second positions based on a first determined state wherein an amplitude of the first phase current is greater than the second phase current, and a second determined state wherein an amplitude of the second phase current is greater than the first phase current.

* * * * *